C. T. MILLER.
VALVE PROTECTOR AND STRAINER.
APPLICATION FILED APR. 8, 1916.
1,207,593.
Patented Dec. 5, 1916.
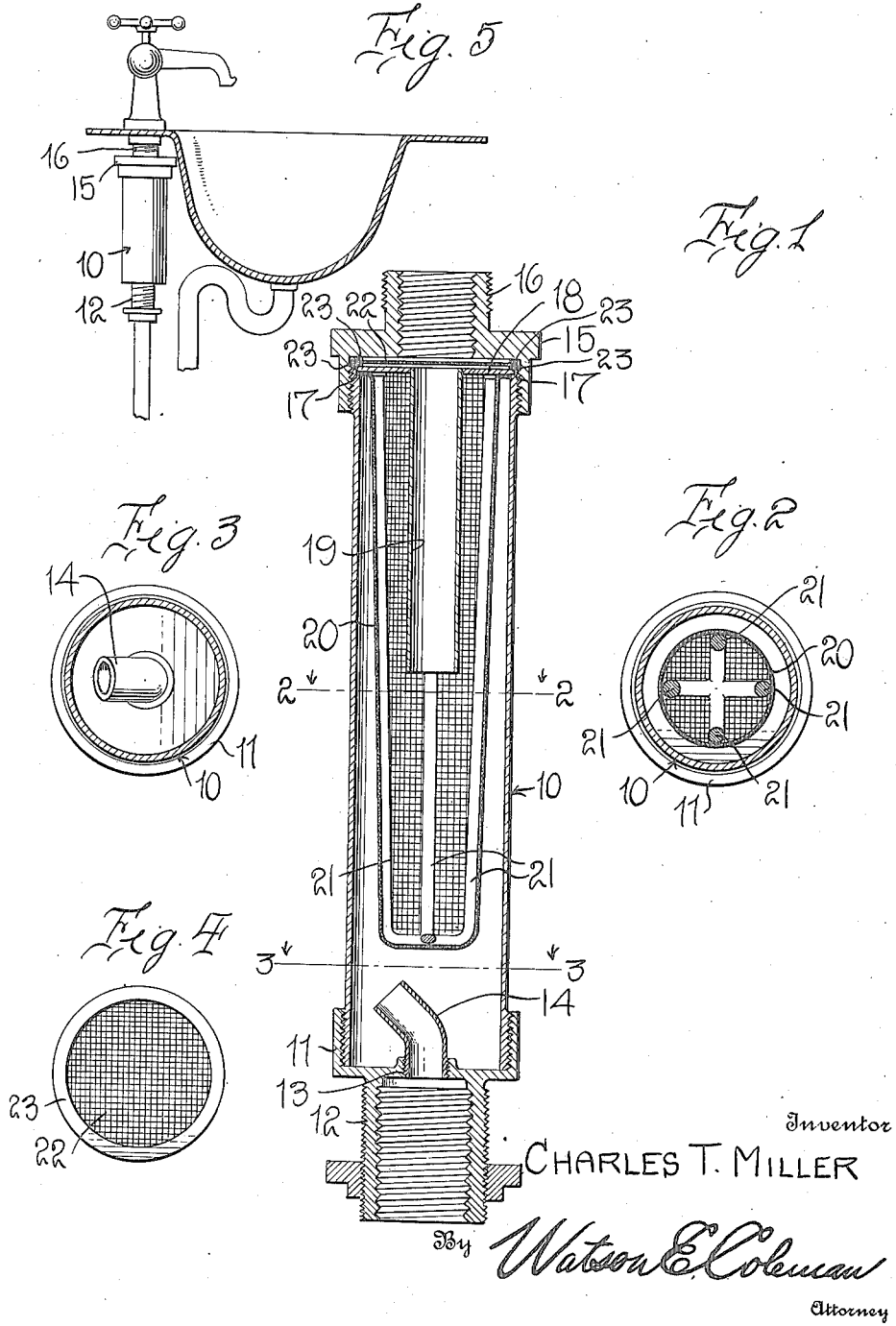
Inventor
CHARLES T. MILLER
By Watson E. Coleman
Attorney

UNITED STATES PATENT OFFICE.

CHARLES T. MILLER, OF MACON, GEORGIA.

VALVE PROTECTOR AND STRAINER.

1,207,593.  Specification of Letters Patent.  Patented Dec. 5, 1916.

Application filed April 8, 1916. Serial No. 89,900.

*To all whom it may concern:*

Be it known that I, CHARLES T. MILLER, a citizen of the United States, residing at Macon, in the county of Bibb and State of Georgia, have invented certain new and useful Improvements in Valve Protectors and Strainers, of which the following is a specification, reference being had to the accompanying drawings.

This invention relates to devices for preventing valves from becoming obstructed in their operation by foreign bodies getting into the valve casing and on the valve seat, and the general object of this invention is the provision of a very simple device to this end which has been found very effective in practice which may be readily taken apart or assembled and which is particularly adapted to be used in connection with self-closing water faucets.

A further object of the invention is the provision of a protector of this character so constructed that the pressure of the water or other liquid entering the protector will not be directed against the gauze screens, thereby preventing the screens from being deformed.

Other objects will appear in the following description.

The invention is illustrated in the accompanying drawings wherein,

Figure 1 is a longitudinal sectional view of my valve protector; Fig. 2 is a section on line 2—2 of Fig. 1; Fig. 3 is a section on line 3—3 of Fig. 1; and Fig. 4 is a plan view of the strainer 22. Fig. 5 is a side elevation, part in section of a faucet and basin showing my invention applied thereto, the basin being illustrated as provided with the self-closing spring-actuated faucet.

Referring to these figures, it will be seen that my protector essentially consists of an outer tubular casing designated 10, one end of this casing being externally screw-threaded for engagement with a union connection having the form of a cap 11 provided with the usual screw-threaded flange or nipple 12, this cap or union 11 has a relatively small central opening 13 with which is engaged a deflected relatively small pipe 14. At the opposite end the casing 10 is exteriorly screw-threaded for engagement with the interior screw threads of the body of a union or cap 15, having the exteriorly and interiorly screw-threaded nipple or flange 16.

The end face of the casing 10 confronting the union 15 is rabbeted as at 17 and disposed within the seat so formed, is an annular disk 18 having a central aperture from which extends a relatively short tube 19 which is in length about equal to half the length of the casing 10. This disk 18 forms the base for the gauze cone 20. This cone is preferably made of relatively fine brass wire gauze. Extending from this disk 18 and disposed within the gauze cone are the wire gauze supports 21 which hold the gauze cone distended and prevent the cone from being deformed. Disposed between the end of the casing 10 and the confronting face of the cap or union 15 is a gauze strainer 22 which is also preferably made of relatively fine brass gauze, the margin of the gauze on both sides being covered by the rubber gaskets 23 so that when the union is screwed home upon the casing 10, the gaskets will be compressed and all liquid will be obliged to pass through the gauze screen 22.

While I do not wish to limit myself to the use of my device in any particular situation, as it is applicable wherever it is desired to prevent the passage of foreign bodies into any particular place, yet my device is particularly adapted for preventing grit, scale or other hard substances from getting into valves and lodging between the valve and valve seat and preventing the valve from closing. It is particularly adapted for use with self-closing water faucets. It will be seen that any dirt, grit, scale or other foreign matter which may be trapped within the casing 10 may be easily dislodged therefrom by removing the union or cap 11 and if necessary removing the gauze cone from the casing. The pressure of the entering liquid does not act directly against the gauze and thus does not act to deform the gauze. The purpose of the tubular member 19 which extends from the base, is to form an air chamber within the protector to thus prevent hammering. This air chamber, it is of course obvious, will surround the tube 19 at the base of said tube.

My protector is designed to be placed in line with any supply pipe for any fixture or like device where the valve requires to be protected from matter that would tend to obstruct or prevent the closing of the valve or which would cut the steel or in any way interfere with the working of the valve. The device is particularly adapted for self-closing faucets, in that a self-closing faucet or valve has only a relatively limited supply of power and cannot grind or work off any foreign matter which may collect from the valve seat. It is therefore particularly necessary that means be provided in connection with a self-closing faucet for preventing sand or other foreign matter from getting to the valve seat.

The tube 19 in the protector is preferably designed to form an air cushion in the top of the protector, this cushion allowing the valve of the faucet to close against the pressure of the water in the pipe and further acting to prevent hammering. The tube 14, because of its deflected form, keeps the water from striking the gauze and furthermore, inasmuch as it extends above the bottom of the protector formed by the cap 11, it provides space for sand or other foreign matter to settle and not be disturbed. Furthermore, as it is of smaller diameter than the protector casing 10 this tube 14 allows the water to pass through the protector much more slowly and thus allows foreign matter to settle. The use of my protector provides for longer service of the faucet or other valve with which it is used and does away with a great deal of repairs and eliminates annoyance due to hammering. Furthermore, it makes the filling of flush tanks less noisy.

Having described my invention, what I claim is:

1. A valve protector of the character described comprising a casing having an outlet and an inlet opening, a cone supporting base mounted in the outlet opening, a wire gauze cone mounted on said base and extending toward the inlet opening, and a tubular member disposed in said base and extending into the center of the cone and discharging at the outlet opening of the casing.

2. In a protector of the character described, a tubular casing, a base mounted in one end of the casing and having a tubular member projecting into the casing, said base at its margins having water-tight engagement with the casing, a gauze screen surrounding the tubular member and extending into the casing, and an inlet tube mounted on the other end of the casing and having its outlet end directed away from the adjacent extremity of the screen.

3. In a protector of the character described, a tubular casing, caps detachably engaging the ends of the casing, a base mounted in one end of the casing and having a tubular member projecting into the casing, a gauze screen surrounding the tubular member, and extending into the casing, and an inlet tube mounted in the other cap and having its outlet end directed away from the adjacent extremity of the gauze screen.

4. A protector of the character decribed comprising a tubular body exteriorly screw-threaded at its ends, caps engaging the ends of the body and having outwardy directed screw-threaded flanges, an annular cone supporting base detachably disposed at one end of the body having a central tubular member entering in the casing, a wire gauze cone mounted upon said base and extending into the casing and beyond the tubular member, a wire gauze disk having a circumferential gasket disposed across the base and between the base and the adjacent cap, the opposite cap being provided at its center with an inlet pipe, the extremity of which is laterally deflected.

5. A valve protector of the character described comprising a casing, a substantially conical wire gauze strainer disposed within the casing, the base of said conical strainer being disposed at the outlet opening of the casing and an inlet pipe projecting inward from the other end of the casing and toward the extremity of the cone, said inlet pipe being laterally deflected to thereby prevent the impact of fluid on the extremity of the cone.

6. A valve protector of the character described comprising a casing, a movable cone of wire gauze supported at the outlet end of the casing and extending into the casing, a removable disk supported at the outlet end of the casing and having a pipe extending into the cone, the space around the pipe forming an air cushion, and a removable cap engaging the casing and holding the cone and disk in place.

In testimony whereof I hereunto affix my signature in the presence of two witnesses.

CHARLES T. MILLER.

Witnesses:
F. C. HARDY,
T. E. YOUNG.